United States Patent
Kovacik et al.

(10) Patent No.: US 6,601,814 B2
(45) Date of Patent: Aug. 5, 2003

(54) ROTATABLE HOOK MOUNT FOR UTILITY LIGHT

(75) Inventors: James D. Kovacik, Brecksville, OH (US); Paul S. Blanch, Broadview Heights, OH (US); Joseph J. Smith, Wooster, OH (US)

(73) Assignee: Alert Safety Lite Products Co., Inc., Bedford Heights, OH (US)

(*) Notice: Subject to any disclaimer, the term of this patent is extended or adjusted under 35 U.S.C. 154(b) by 0 days.

(21) Appl. No.: 09/928,932

(22) Filed: Aug. 14, 2001

(65) Prior Publication Data

US 2003/0034428 A1 Feb. 20, 2003

(51) Int. Cl.$^7$ .................................................. B42F 13/00
(52) U.S. Cl. ........................ 248/339; 248/304; 362/376; 362/396
(58) Field of Search ................................. 248/339, 340, 248/215, 304, 302, 303; 362/396, 263, 376, 394, 413, 247

(56) References Cited

U.S. PATENT DOCUMENTS

| | | | |
|---|---|---|---|
| 2,510,708 A | * 6/1950 | Marshall | 248/339 X |
| 3,629,900 A | 12/1971 | Beerli, Jr. | |
| 3,996,459 A | 12/1976 | Schwartz | |
| 4,236,195 A | 11/1980 | Kovacik | |
| 4,305,120 A | * 12/1981 | Lacinski | 362/396 |
| 4,774,647 A | 9/1988 | Kovacik et al. | |
| 5,125,131 A | 6/1992 | Leblanc | |
| 5,135,145 A | 8/1992 | Hannes et al. | |
| 5,163,751 A | * 11/1992 | Bottiglieri | 362/376 |
| 5,408,726 A | 4/1995 | Kent | |
| 5,484,242 A | 1/1996 | Meyer | |
| 5,702,263 A | 12/1997 | Baumann et al. | |
| 5,924,667 A | * 7/1999 | Grahn et al. | 248/304 |
| 6,170,966 B1 | 1/2001 | Schwarzmann | |

FOREIGN PATENT DOCUMENTS

CA    2066298    10/1993

* cited by examiner

Primary Examiner—Ramon O. Ramirez
(74) Attorney, Agent, or Firm—MacMillan, Sobanski & Todd, LLC

(57) ABSTRACT

A rotatable hook mount apparatus for suspending a utility light includes a first locking member attached to a light guard of the utility light and a second locking member attached to a shaft portion of a hook. The shaft portion is rotatably received in a bore formed in the first locking member. Adjacent faces of the locking members have cooperating teeth for preventing relative rotation. A spring biases the teeth into engagement and the second locking member with the attached hook can be moved against the spring bias to disengage the teeth for rotation of the hook relative to the light guard.

20 Claims, 3 Drawing Sheets

ROTATABLE HOOK MOUNT FOR UTILITY LIGHT

BACKGROUND OF THE INVENTION

The present invention relates generally to a mounting apparatus for a utility or trouble light and, in particular, to a rotatable hook mount adapted to be attached to a utility light guard for suspending the utility light.

It is often desirable to suspend a body, such as a hand-held electric work or utility light, for any number of purposes. In these situations, it is common to attach hooks or similar devices to the body. It is often difficult, however, to find a suitable location for suspending the body and, once the body has been suspended, it is also often a challenging task to orient the body in a desired direction. In the example of an electric utility light, this task entails directing the illumination from the light bulb towards a work object or the like. The process of finding a suitable location for the hook and then attempting to orient the body in the desired direction can consume an inordinate amount of time.

It is also common for two members having opposing coplanar mating faces, joined at their respective centers, to have a means for preventing relative rotation between the opposing faces. A typical means for preventing relative rotation between the opposing faces is to provide each face with a plurality of projections and grooves that engage with a corresponding plurality of projections and grooves on the opposing face.

It is also often common to need the ability to reorient members having opposing coplanar circular mating faces, joined at their respective centers, relative to one other while still maintaining a means for preventing the rotation after the reorientation is complete. Typically, a means for disengaging the projections and grooves in the opposing faces is provided. The means for disengaging is typically arranged so that the members remain joined at their respective centers while they are disengaged. The disengaging means initially disengages the opposing faces, the members are next rotated to the desired orientation, after which the facing projections and grooves are engaged again.

It is desirable to combine the above-mentioned features in order allow a body to be suspended from a hook or similar apparatus and then be oriented in various directions after it has been suspended.

It is an object of the present invention, therefore, to combine a hook with opposing circular planar faces joined at their respective centers with a means for preventing rotation between the faces and with a means for disengaging and reorienting the faces in order to allow a body to be suspended from various places and be oriented in numerous directions after it has been suspended.

SUMMARY OF THE INVENTION

The present invention concerns a rotatable hook mount for attachment to a portion of a utility or trouble light, such as a light guard, whereby the utility light can be suspended from a hook and oriented in numerous directions.

The rotatable hook mount includes a hook member having a shaft portion and a hook portion. The hook portion of the hook member may be S-shaped, C-shaped, eye-shaped, or any similar shape, and is adapted to be assembled with an upper locking member. The upper locking member is preferably disk-shaped and includes upper and lower planar faces. A bore extends through the upper locking member, forming an aperture in each planar face. The bore receives the shaft portion of the hook member. During assembly, the hook member is press fit into the bore of the upper locking member, and a length of the shaft portion of the hook member extends axially beyond the lower planar face of the upper locking member. The lower planar face of the upper locking member also includes serrations, or a set of teeth.

The combined hook member and upper locking member cooperates with and attaches to a lower locking member. The lower locking member includes a disk-shaped portion and a protrusion portion extending from the disk-shaped portion. The disk-shaped portion includes upper and lower planar faces. A bore extends through the lower locking member, forming an aperture in each planar face. The upper planar face of the lower locking member includes a set of teeth that cooperate with the teeth of the upper locking member to prevent relative rotation of the locking members. The shaft portion of the hook member also extends through the bore and axially beyond the lower planar face of the lower locking member. The lower locking member is adapted to be affixed, at its protrusion portion, to the body that is to be suspended on the hook member. The lower locking member thus remains stationary once it is affixed to the body.

The portion of the shaft of the hook member that extends beyond the lower locking member extends through a preferably helical compression spring member. A retaining means is attached to an end of the shaft portion of the hook member to retain the spring member which biases the first locking member against the second locking member.

In operation, when a force in an upward direction is exerted on the hook member, the spring member is compressed, the upper locking member moves away from the lower locking member to disengage the sets of teeth, and the combined hook member and upper locking member may be rotated relative to the lower locking member and the body. When the hook member is allowed to return in a downward direction with the aid of the spring member, the respective locking members reengage and prevent relative rotation. The spring member thus advantageously allows the locking members to be disengaged and rotated relative to each other without having to be completely detached.

The teeth of the locking members are preferably arranged with equal spacing and equal angles between the teeth so as to permit engagement at a number of positions of relative rotation. For example, in a preferred embodiment, each of the locking members contains fifteen teeth resulting in the same number of locking positions spaced twenty-four degrees apart. Those skilled in the art, however, will appreciate that any number of teeth formed can be used while still remaining within the scope of the present invention. A greater number of teeth, however, will provide a greater amount of flexibility in allowing the locking members to be engaged at more locations around their respective circumferences.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5b is a bottom perspective view of the lower locking member shown in FIG. 5a.

DESCRIPTION OF THE PREFERRED EMBODIMENT

Figure 6:
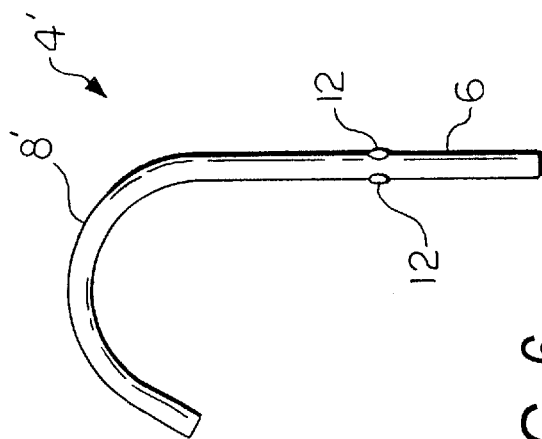
FIG. 6 is an elevation view of an alternate embodiment hook member in accordance with the present invention.

Referring now to the drawing figures, a rotatable hook mount is shown generally at 2 and is attached to an inside surface at an upper end of a reflector portion 10 of a utility light guard, the cage portion not being shown. The rotatable hook mount 2 includes a hook member shown generally at 4 typically formed of wire or a rod having a cylindrical cross section. The hook member 4 has a generally straight shaft portion 6 connected to a bent hook portion 8 having alternating curved and straight sections. An alternative embodiment hook member 4', having a curved, generally C-shaped hook portion, 8', is shown in FIG. 6. The hook portion 8 of the hook member 4 may be bent into a suitable shape, such as an S-shape, a C-shape, an eye-shape, or any similar shape. The hook member 4 may be constructed of any material, such as steel, that is able to support, without deforming, the weight of the reflector portion 10 to which it is attached and the remainder of the utility light. A typical utility or trouble light is shown in the U.S. Pat. No. 4,774,647 which is incorporated herein by reference. Alternatively, the hook member 4 may be tubular, and have a hollow cross-section (not shown.). The hook member 4 includes a pair of opposed projections 12 on its shaft portion 6 that assist in aligning the hook member 4 when it is assembled with an upper locking member 14 as described below.

Figure 4A:
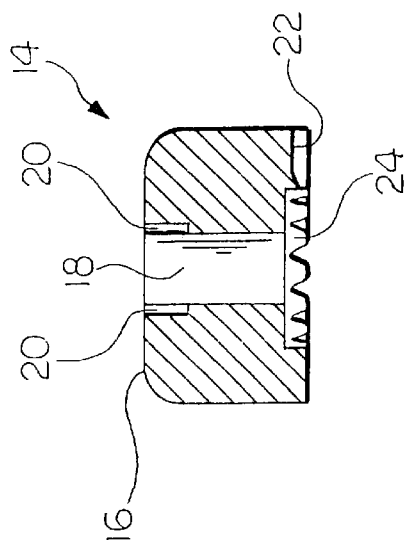
FIG. 4a is a cross-sectional view of the upper locking member shown in FIG. 2.
Figure 4B:
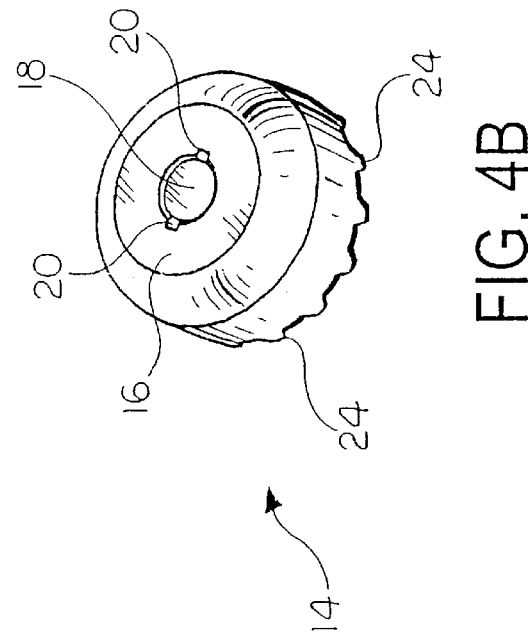
FIG. 4b is a perspective view of the upper locking member shown in FIG. 2 looking at an upper face.
Figure 3:
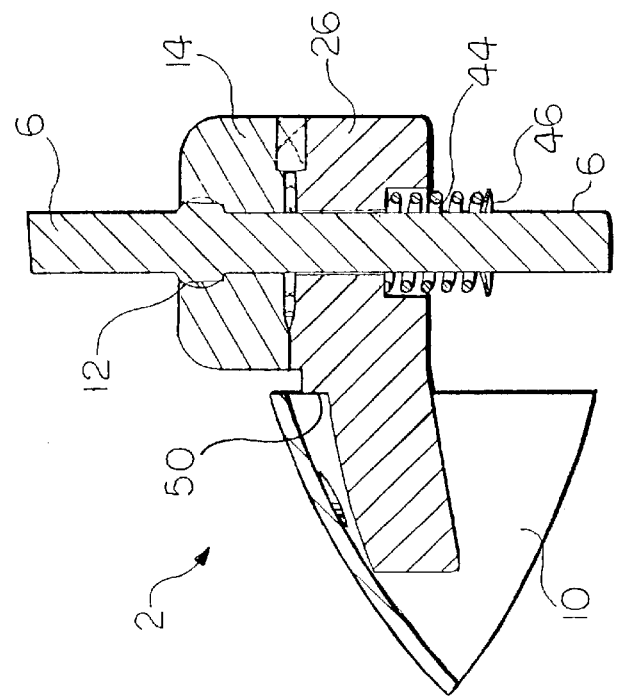
FIG. 3 is an enlarged fragmentary cross-sectional view of the rotatable hook mount shown in FIG. 1.
Figure 5A:
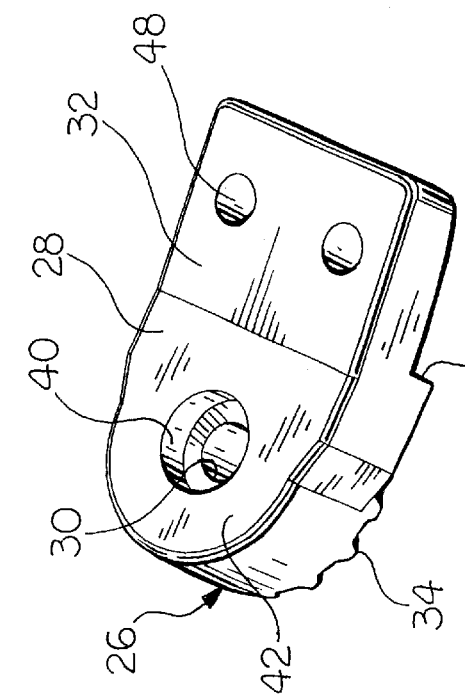
FIG. 5a is a top perspective view of the lower locking member shown in FIG. 2.
Figure 5B:
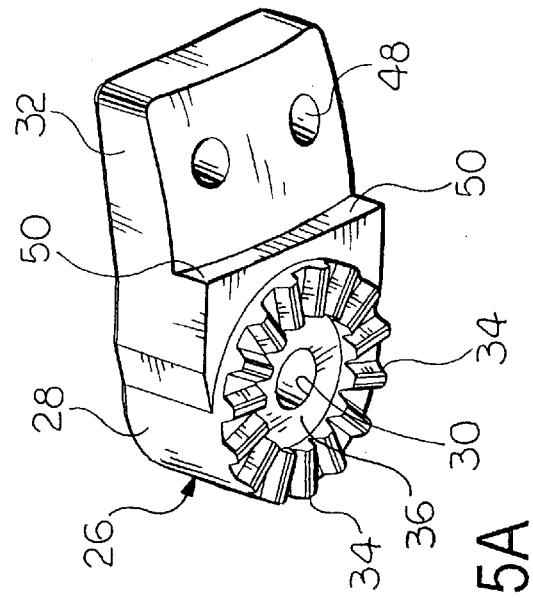

The generally disk-shaped upper locking member 14 has a planar upper face 16 and a generally parallel planar lower face 22 (FIG. 4a). A cylindrical axial bore 18 extends through the upper locking member 14 between the planar faces 16 and 22. The bore 18 receives the shaft portion 6 of the hook member 4. The bore 18 includes a pair of axially extending tapered grooves 20 formed in the wall of the bore 18 and open at the upper face 16. The tapered grooves 20 extend downwardly only to approximately half the thickness of the upper locking member 14. During assembly of the hook member 4 and the upper locking member 14, a free end of the shaft portion 6 of the hook member 4 is inserted into the bore 18 from the upper planar face 16. The projections 12 on the shaft portion 6 cooperate with the grooves 20 formed in the bore 18, which helps to ensure the proper axial and radial alignment of the hook member 4 and the upper locking member 14. An interference between the projections 12 and the grooves 20 also assists in securing the hook member 4 to the upper locking member 14. After assembly, a length of the shaft portion 6 extends axially beyond the lower planar face 22 of the upper locking member 14. The lower face 22 of the upper locking member 14 has a plurality of teeth 24 formed thereon extending radially from and equally spaced about the bore 18.

The assembled hook member 4 and upper locking member 14 are further assembled with a lower locking member 26. The lower locking member 26 includes a disk-shaped body portion 28 and a protrusion portion 32 that extends radially from the disk-shaped portion 28. The disk-shaped portion 28 includes an upper planar face 36 and a generally parallel lower planar face 42. A cylindrical axial bore 30 extends through the lower locking member 26 between the faces 36 and 42. The upper planar face 36 has a plurality of teeth 34 formed thereon extending radially from and equally spaced about the bore 30. The size and spacing of the teeth 24 and the teeth 34 permit cooperative interlocking when the lower face 22 is positioned adjacent the upper face 36 thereby prevent relative rotation of the locking members 14 and 26. The bore 30 of the lower locking member 26 is expanded at the lower face 42 with a counterbore 40.

Figure 2:
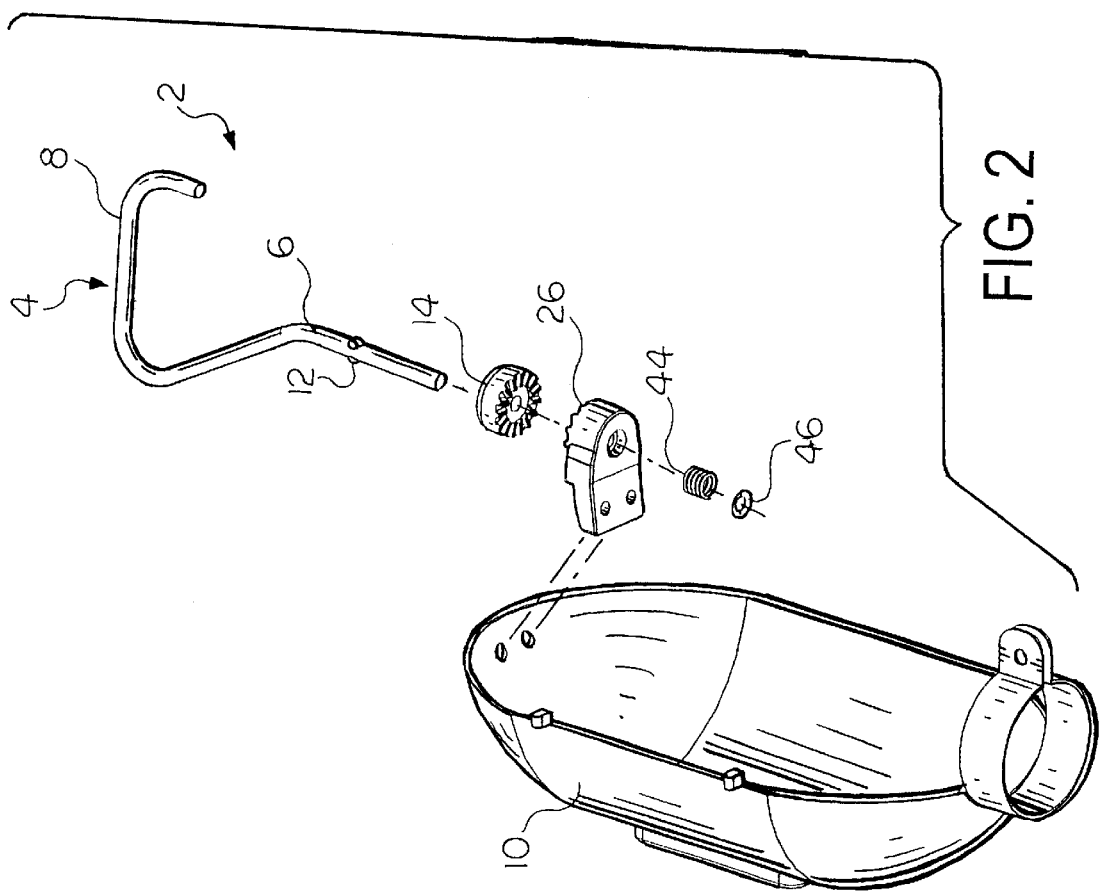
FIG. 2 is an exploded perspective view of the rotatable hook mount shown in FIG. 1.
Figure 1:
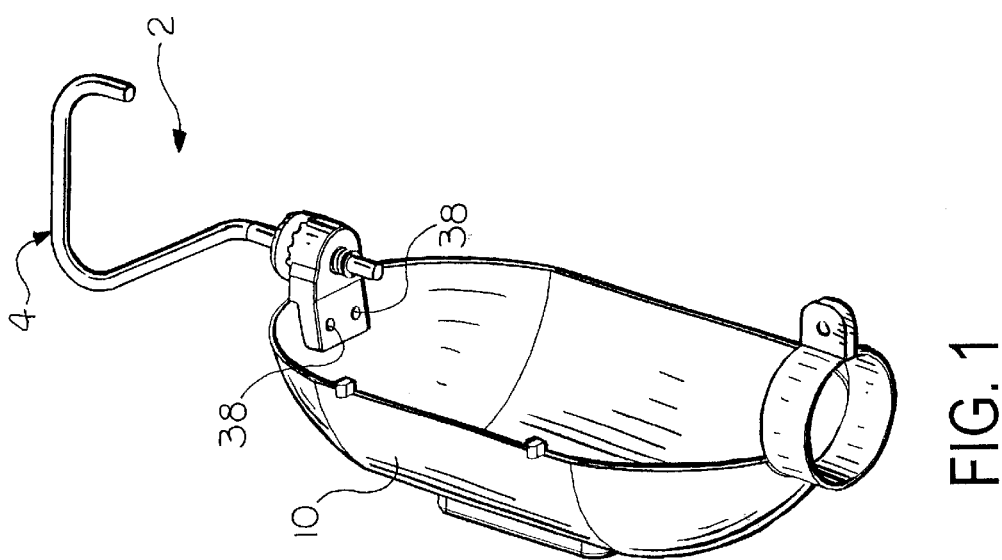
FIG. 1 is a perspective view of a rotatable hook mount attached to a utility lightguard in accordance with the present invention.

The lower locking member 26 is adapted to be affixed at its protrusion portion 32 to the body 10 that is to be suspended by the hook member 4. The protrusion portion 32 preferably includes at least one bore 48 through which a fastener 38, such as a rivet, a bolt or the like (FIG. 1) extends to affix the lower locking member 26 to the body 10. The protrusion portion 32 may be adapted to be affixed to numerous types of surfaces, depending on the profile of the body 10 to which it will be affixed. After assembly, the lower locking member 26 remains stationary once it is affixed to the body 10. The protrusion portion 32 preferably includes a lip 50 to aid in aligning the lower locking member 26 to the body 10, as well as preventing rotation of the lower locking member 26 with respect to the body 10.

A preferably helical compression spring member 44 is received on the shaft portion 6 of the hook member 4 that extends beyond the lower planar face 42 of the lower locking member 26, and has an upper end preferably received in the counterbore 40. A retaining means 46 is further attached to the shaft portion 6 of the hook member 4 below the spring member 44 to retain it in place in a rest position on the hook member 4 and in the second diameter 40 of the bore 30. The retaining means 46 is shown as a speed nut, but can be any similar device that is attached to the shaft portion 6 of the hook member 4 by an interference fit, a threaded connection, rivet, or the like. The spring member 44 in its rest position thus biases the upper locking member 14 downwardly against the lower locking member 26. Alternatively, the spring member 44 can be a flat spring, or another member that functions as a spring to bias the lower locking member 14 against the lower locking member 26.

In operation, when a force in an upward direction is exerted on the hook member 4, the spring member 44 is compressed, the upper locking member 14 moves away from the lower locking member 26 to disengage the sets of teeth 24 and 34, and the attached hook member and upper locking member may be rotated relative to the lower locking member and the body 10. When the hook member 4 is allowed to return in a downward direction with the aid of the spring member 44, the respective locking members 14 and 26 reengage and prevent relative rotation. The spring member 44 thus advantageously allows the locking members 24 and 34 to be disengaged and rotated relative to each other without having to be completely detached.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A rotatable hook mount apparatus for suspending a utility light having a light guard comprising:

a first locking member, said first locking member having a disk portion and a projection portion, said projection portion adapted to be attached to a light guard, said disk portion having an upper face, a lower face, and a first bore formed therethrough between said faces, said upper face of said disk portion having a first means for preventing rotation formed thereon;

a disk-shaped second locking member having an upper face, a lower face, and a second bore formed therethrough between said second locking member faces, said lower face of said second locking member having a second means for preventing rotation formed thereon;

a hook member having a shaft portion and a hook portion, said shaft portion being fixedly received in said second bore of said second locking member and being rotatably received in said first bore of said first locking member, said shaft portion extending beyond said lower planar face of said first locking member, including at least one projection extending from said shaft portion and received in at least one groove formed in a wall of said second bore of said second locking member;

a spring member received on said shaft portion of said hook member below said lower face of said first locking member, said first bore having a larger diameter counterbore formed at said lower face and said spring member being received in said counterbore; and a retaining means attached to said shaft portion for retaining said spring member on said shaft portion, said spring member biasing said second locking member against said first locking member whereby said first and second means for preventing rotation engage and cooperate to prevent relative rotation between said first and second locking members and whereupon movement of said hook member and said second locking member away from said upper surface of said first locking member disengages said first and second means for preventing rotation to permit rotation of said hook member relative to said first locking member.

2. The rotatable hook mount according to claim 1 wherein said hook portion of said hook member is C-shaped.

3. The rotatable hook mount according to claim 1 wherein said retaining means is a speed nut.

4. The rotatable hook mount according to claim 1 wherein said first means for preventing rotation is a first plurality of teeth extending from said upper face of said first locking member, and said second means for preventing rotation is a second plurality of teeth extending from said lower face of said second locking member.

5. A rotatable hook mount apparatus for suspending a utility light therefrom comprising:

a first locking member, said first locking member having a disk portion and a projection portion, said projection portion adapted to be attached to a utility light, said disk portion having an upper planar face, a lower planar face, and a first bore formed therethrough between said faces, said upper face of said disk portion having a first means for preventing rotation formed thereon;

a disk-shaped second locking member having an upper planar face, a lower planar face, and a second bore formed therethrough between said upper and lower faces of said second locking member, said lower face of said second locking member having a second means for preventing rotation formed thereon, said second bore having at least one groove formed in a wall thereof adjacent to said upper face of said second locking member;

a hook member having a shaft portion and a hook portion, said shaft portion having at least one projection extending therefrom, said shaft portion of said hook member being received in said second bore of said second locking member with said at least one projection engaging said at least one groove, said shaft portion being rotatably received in said first bore of said first locking member; and a spring member mounted on said shaft portion and biasing said lower face of said second locking member toward said upper face of said first locking member to releasably engage said first and second means for preventing rotation.

6. The rotatable hook mount according to claim 5 wherein said projection portion of said first locking means is attached to a reflector of a light guard.

7. The rotatable hook mount according to claim 6 wherein said projection portion of said first locking means has a lip formed thereon for engaging the light guard.

8. The rotatable hook mount according to claim 5 wherein said first bore has an enlarged diameter counterbore formed at said lower face of said first locking member and said spring member is received in said counterbore.

9. The rotatable hook mount according to claim 5 including a retaining means attached to said shaft portion for retaining said spring member on said shaft portion.

10. The rotatable hook mount according to claim 9 wherein said retaining means is a speed nut.

11. The rotatable hook mount according to claim 5 wherein said first means for preventing rotation is a first plurality of teeth extending from said upper face of said first locking means, and said second means for preventing rotation is a second plurality of teeth extending from a lower face of said second locking means.

12. The rotatable hook mount according to claim 5 wherein said hook portion of said hook member is C-shaped.

13. The rotatable hook mount according to claim 5 wherein said hook portion of said hook member is S-shaped.

14. A rotatable hook mount apparatus for suspending a utility light having a light guard comprising:

a lower locking member having a disk portion and a projection portion, said projection portion adapted to be attached to a light guard and having a lip formed thereon for engaging the light guard, said disk portion having an upper face, a lower face, and a first bore formed therethrough between said faces, said upper face of said disk portion having a first set of teeth formed thereon;

a disk-shaped upper locking member having an upper face, a lower face, and a second bore formed therethrough between said upper locking member faces, said lower face of said upper locking member having a second set of teeth formed thereon;

a hook member having a shaft portion and a hook portion, said shaft portion having a pair of projections fixedly received in an associated pair of grooves in a wall of said second bore of said upper locking member and being rotatably received in said first bore of said lower locking member, said shaft portion extending beyond said lower planar face of said lower locking member;

a spring received on said shaft portion of said hook member and extending into a counterbore formed in said lower face of said lower locking member; and a retaining means attached to said shaft portion for retaining said spring member on said shaft portion, said spring member biasing said upper locking member against said lower locking member whereby said first and second sets of teeth engage and cooperate to prevent relative rotation between said lower and upper locking members and whereupon movement of said hook member and said upper locking member away from said upper surface of said lower locking member disengages said first and second sets of teeth to permit rotation of said hook member relative to said lower locking member.

a hook member having a shaft portion and a hook portion, said shaft portion having a pair of projections fixedly received in an associated pair of grooves in a wall of said second bore of said upper locking member and being rotatably received in said first bore of said lower locking member, said shaft portion extending beyond said lower planar face of said lower locking member;

a spring received on said shaft portion of said hook member and extending into a counterbore formed in said lower face of said lower locking member; and a retaining means attached to said shaft portion for retaining said spring member on said shaft portion, said spring member biasing said upper locking member against said lower locking member whereby said first and second sets of teeth engage and cooperate to prevent relative rotation between said lower and upper locking members and whereupon movement of said hook member and said upper looking member away from said upper surface of said lower locking member disengages said first and second sets of teeth to permit rotation of said hook member relative to said lower locking member.

15. A rotatable hook mount apparatus for suspending a utility light having a light guard comprising:

a lower locking member having a disk portion and a projection portion, said projection portion adapted to be attached to a light guard and having a lip extending between said disk portion and said projection portion for engaging the light guard, said disk portion having an upper face, a lower face, and a first bore formed therethrough between, said faces, said upper face of said disk portion having a first set of teeth formed thereon, said lip extending in a plane generally parallel to an axis of said first bore;

a disk-shaped upper locking member having an upper face, a lower face, and a second bore formed therethrough between said upper locking member faces, said lower face of said upper locking member having a second set of teeth formed thereon;

a hook member having a shaft portion and a book portion, said shaft portion being fixedly received in said second bore of said upper locking member for rotation therewith and being rotatably received in said first bore of said lower locking member, said shaft portion extending beyond said lower planar face of said lower locking member;

a spring received or said shaft portion or said hook member adjacent said lower face of said lower locking member; and a retaining means attached to said shaft portion for retaining said spring member on said shaft portion, said spring member biasing said upper locking member against said lower locking member whereby said first and second sets of teeth engage and cooperate to prevent relative rotation between said lower and upper locking members and whereupon movement of said hook member and said upper locking member away from said upper surface of said lower locking member disengages said first and second sets of teeth to permit rotation of said hook member with said upper locking member relative to said lower locking member.

16. The rotatable hook mount according to claim 15 including a light guard attached to said projection portion of said lower locking member, said lip engaging said light guard for aligning said lower locking member with said light guard and for preventing relative rotation between said lower locking member and said light guard.

17. A rotatable hook mount apparatus for suspending a utility light having a light guard comprising:

a first locking member, said first locking member having a disk portion and a projection portion, said projection portion adapted to be attached to a light guard, said disk portion having an upper face, a lower face, and a first bore formed therethrough between said faces, said upper face of said disk portion having a first means for preventing rotation formed thereon;

a disk-shaped second locking member having an upper face, a lower face, and a second bore formed therethrough between said second locking member faces, said lower fare of said second locking member having a second means for preventing rotation formed thereon, and at least one axially extending groove formed in a wall of said second bore and open at said upper face of said second locking member;

a hook member having a shaft portion and a hook portion, said shaft portion being fixedly received in said second bore of said second locking member and being rotatably received in said first bore of said first locking member, said shaft portion extending beyond said lower planar face of said first locking member, said shaft portion including at least one projection extending therefrom and received in said at least one groove formed in said second locking member;

a spring member received on said shaft portion of said hook member below said lower face of said first locking member; and a retaining means attached to said shaft portion for retaining said spring member on said shaft portion, said spring member biasing said second locking member against said first locking member whereby said first and second means for preventing rotation engage and cooperate to prevent relative rotation between said first and second locking members and whereupon movement of said hook member and said second locking member away from said upper surface of said first locking member disengages said first and second means for preventing rotation to permit rotation of said hook member with said second locking member relative to said first locking member.

18. The rotatable hook mount according to claim 17 wherein said at least one groove is tapered.

19. The rotatable hook mount according to claim 17 wherein said second locking member includes a second groove formed in said wall of said second bore and open at said upper surface of said second locking member, and said hook member includes a second projection extending from said shaft portion and received in said second groove.

20. The rotatable hook mount according to claim 17 including a light guard attached to said projection portion of said first locking member.

* * * * *